(12) United States Patent
Gohill et al.

(10) Patent No.: US 7,846,375 B2
(45) Date of Patent: Dec. 7, 2010

(54) METHODS FOR RELAXING STRESS IN POLYMERIC MATERIALS

(75) Inventors: Bharatkumar B. Gohill, Sanford, FL (US); Scott Jones, University City, MO (US)

(73) Assignee: Tyco Healthcare Group LP, Mansfield, MA (US)

( * ) Notice: Subject to any disclaimer, the term of this patent is extended or adjusted under 35 U.S.C. 154(b) by 458 days.

(21) Appl. No.: 11/522,887

(22) Filed: Sep. 18, 2006

(65) Prior Publication Data
US 2007/0069430 A1    Mar. 29, 2007

Related U.S. Application Data

(60) Provisional application No. 60/718,086, filed on Sep. 16, 2005.

(51) Int. Cl.
*B29C 71/04* (2006.01)
(52) U.S. Cl. .................................... 264/482; 264/230
(58) Field of Classification Search .............. 264/482, 264/230, 400, 446, 492; 219/121.65, 121.66
See application file for complete search history.

(56) References Cited

U.S. PATENT DOCUMENTS

| | | | | |
|---|---|---|---|---|
| 3,678,142 A | * | 7/1972 | Dubach | 264/482 |
| 3,790,744 A | * | 2/1974 | Bowen | 219/121.69 |
| 4,339,303 A | | 7/1982 | Frisch et al. | |
| 4,594,204 A | | 6/1986 | Heidenreich et al. | |
| 4,601,689 A | * | 7/1986 | Finkle et al. | 493/251 |
| 4,868,006 A | * | 9/1989 | Yorkgitis et al. | 427/555 |
| 5,017,423 A | * | 5/1991 | Bossmann et al. | 442/327 |
| 5,354,414 A | | 10/1994 | Feygin | |
| 5,529,813 A | * | 6/1996 | Kobsa et al. | 427/555 |
| 5,958,322 A | * | 9/1999 | Thompson et al. | 264/342 RE |
| 6,048,188 A | | 4/2000 | Hull et al. | |
| 6,743,388 B2 | * | 6/2004 | Sridharan et al. | 264/205 |

OTHER PUBLICATIONS

International Search Report for PCT/US06/36159 dated Jan. 25, 2008.

* cited by examiner

*Primary Examiner*—Joseph S Del Sole
*Assistant Examiner*—Robert Dye
(74) *Attorney, Agent, or Firm*—Lisa E. Winsor, Esq.

(57) ABSTRACT

Methods and systems for relaxing stresses in polymeric articles by application of laser energy are disclosed.

26 Claims, 3 Drawing Sheets

METHODS FOR RELAXING STRESS IN POLYMERIC MATERIALS

This application claims priority from U.S. Provisional Application Ser. No. 60/718,086 filed Sep. 16, 2005, the contents of which are incorporated herein by reference in its entirety.

BACKGROUND

Polymeric materials such as plastics are highly valuable for their strength and ability to be readily molded, extruded, or otherwise formed into a variety of shapes. However, if a plastic object is deformed or bent during or after molding, stress (or stored energy) can be introduced into the object. Such stored energy can cause undesirable deformation (e.g., warping) of the object and can result in movement or creep of the polymeric material as a result of the stress. Cracking, crazing or weakening of the object can result. In addition, the chemical or solvent resistance of a polymeric article may be adversely affected by stresses.

Although such stress or stored energy can dissipate over time (a process known as stress relaxation), it is often preferable to move quickly dissipate the stored energy. Previously-reported methods for relaxing stresses include annealing of the object in an oil bath, heating the object in a conventional oven, or exposing the object to infra-red or microwave radiation (e.g., using infra-red lamps or microwave sources). These processes generally involve the annealing of the entire object and can be rather slow and somewhat cumbersome. Moreover, such methods can cause shrinkage or other undesirable changes in the properties of the polymeric article.

Improved methods for reducing stresses in polymeric materials are therefore needed.

SUMMARY

It has now been discovered that polymeric materials can be rapidly and selectively relaxed by exposing a polymeric article, or a portion thereof, to laser radiation at a wavelength selected to be absorbed by, and to thereby heat, the article or selected portion thereof, such that internal stresses or stored energy are relaxed or dissipated.

In one aspect, the invention provides a method for relieving stress in a polymeric article. The method includes the step of exposing at least a portion of the article to laser radiation for sufficient time to relieve stress in the article.

In certain preferred embodiments, the polymeric article includes a semi-crystalline polymeric material. In certain preferred embodiments, the article is made from polypropylene or blends or copolymers of polypropylene.

In certain preferred embodiments, the polymeric article includes an amorphous polymeric material, more preferably a polysulfone or a polycarbonate.

In certain preferred embodiments, the laser radiation is infrared laser radiation. In preferred embodiments, the laser radiation has a wavelength in the range from 0.8 µm to 30 µm.

In certain preferred embodiments, the laser radiation is scanned over a selected portion of a surface of the article.

In certain preferred embodiments, the laser radiation is scanned over a surface of the article in a pattern.

In certain preferred embodiments, the laser radiation has a beam width of about 0.1 mm to about 1 mm.

In certain preferred embodiments, the laser radiation is applied in pulses, which are preferably for a total of less than 10 seconds.

In certain preferred embodiments, the laser radiation is produced with a laser having a power of not more than 50 watts.

In certain preferred embodiments, the laser radiation is produced with a $CO_2$ laser, and in preferred embodiments, the $CO_2$ laser is off-focus.

In certain preferred embodiments, the polymeric article is heated to a temperature above the glass transition temperature of the polymeric material.

In certain preferred embodiments, stress is relieved substantially without ablating polymeric material from a surface of the article.

In certain preferred embodiments, stress is relieved substantially without altering an external dimension of the article.

In certain preferred embodiments, the surface area of the article exposed to laser radiation is not more than about 1 square millimeter.

In certain preferred embodiments, the pattern comprises a plurality of parallel lines.

In certain preferred embodiments, a surface of the article is heated to a depth of not more than 1 millimeter.

In certain preferred embodiments, the article is treated with laser radiation for less than 10 seconds.

In certain preferred embodiments, a total area of the article exposed to laser radiation is less than about 0.1 square inch.

In certain preferred embodiments, a surface area of the article exposed to laser radiation is less than about 10% of the total surface area of the article.

In another aspect, the invention provides apparatus for relieving stress in a polymeric article. In one embodiment, the apparatus includes a source of laser radiation for irradiating the polymeric article for sufficient time to relieve stress in the article without substantially ablating material from a surface of the article. In preferred embodiments, the source of laser radiation includes a laser and a scanner for controlling the laser. In preferred embodiments, the laser is a $CO_2$ laser.

In still another aspect, the invention provides a stress-relaxed article treated according to any of the methods of the invention.

These and other aspects, embodiments, and advantages of the invention are described in the specification and claims herein.

BRIEF DESCRIPTION OF THE DRAWINGS

Various embodiments of the presently disclosed method and apparatus for relieving stress in polymeric articles are disclosed herein with reference to the drawings, wherein.

DETAILED DESCRIPTION OF THE INVENTION

Figure 1:
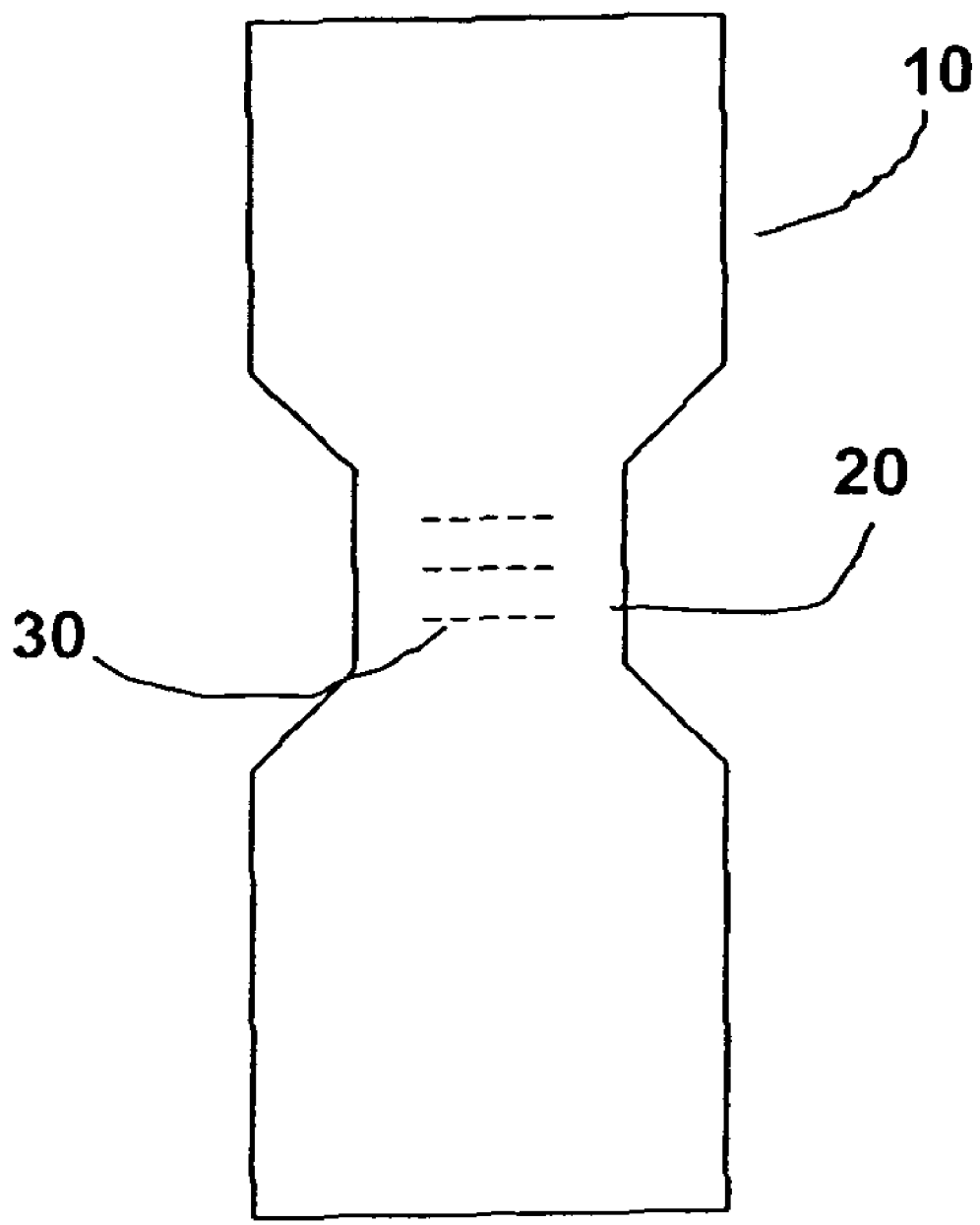
FIG. 1 shows a pattern of laser irradiation used to relax stresses in a molded polymeric article.

Embodiments of the presently disclosed method and apparatus for relieving stresses in polymeric articles or workpieces will now be described in detail with reference to the drawings wherein like reference numerals designate identical or corresponding elements in each of the several views.

In one embodiment, the invention provides a method of relieving stress in a polymeric article. The method includes exposing at least a portion of the article to laser radiation for sufficient time to relieve stress in the article. In preferred embodiments, a selected portion of the surface of the article is exposed to laser radiation.

According to the invention, a polymeric article (workpiece) is positioned to receive laser energy, and laser energy is supplied for a period of time sufficient to cause relaxation of at least a portion of any stress (e.g., tensile or compressive stress) or stored energy in the article (or a selected portion thereof). Such stresses can result from the deformation or bending of an article from a configuration as molded or formed to a new, higher-stress configuration. For example, folding of an article can result in stresses in the article, e.g., at the fold line. Thus, an article can be folded or otherwise manipulated such that stresses are present, prior to laser treatment according to the invention. As another example, residual molding stresses (i.e., stresses developed during the process of molding an article) can be relaxed according to this invention. Residual molding stresses can be measured after an article is formed (e.g., using birefringence analysis), or can be predicted based on the size and shape of the mold using standard methods. Additionally, stresses in a polymeric part caused by interference or interaction between the polymeric part and a second part (e.g., as the result of assembly of the polymeric part and a second part, which may be polymeric, metallic or the like) can also be relaxed as described herein. Treatment to relieve such stresses can provide a new, low-stress condition for the article.

In a preferred embodiment, stresses in the polymeric article are detected, measured or predicted, e.g., using standard methods such as birefringence analysis or computer modeling. Once the actual or predicted stresses in the polymeric article have been determined, it is possible (and preferred) to selected portions of the article for exposure to laser radiation. Thus, for example, the most highly stressed portions of an article can be treated, while less-stressed or unstressed regions are not treated; this permits efficient use of time and resources in the treatment process.

It will be appreciated that by treating only a portion of the polymeric article, the throughput of the treatment process can be increased. Thus, the invention provides a rapid, efficient method for relieving stresses in polymeric articles.

When the article is ready for treatment, it can be secured in a jig or other holder for treatment with the laser. In preferred embodiments, the article is held in a well-defined position to enable precise aim of the laser beam on the article or selected portion thereof.

The polymeric article can be made from a variety of polymeric materials, including themoplastics and other plastic materials. Exemplary materials include polypropylene and polypropylene copolymers (preferably polypropylene/ethylene copolymers), polysulfones, polycarbonates, polystyrene and copolymers thereof, polyesters, and the like; or copolymers, blends or mixtures of such materials. In general, the only requirement for the material used is that the material must be capable of absorbing laser energy as described herein such that the polymeric article (or portion thereof) is heated and stresses are thereby relaxed.

The polymeric material can be a crystalline or semi-crystalline material; alternatively, the material can be an amorphous material. Laser treatment may, but need not, change the crystallinity of the material.

The laser used can be any laser capable of delivering sufficient energy to the polymeric article to heat at least a portion of the article and thereby relieve stresses (or stored energy) in the article. Preferred lasers include carbon dioxide ($CO_2$) lasers; suitable $CO_2$ lasers are well-known to the skilled artisan and are commercially available. Preferred lasers provide energy in the infra-red range, preferably to mid-to-far infrared range (e.g., from 0.8 to 30 μm, more preferably from 5-15 μm, and most preferably about 10.6 μm). Additional lasers capable of infrared emission include diode lasers and infrared neodymium; solid state lasers. The selection of a laser for use according to the invention will be determined, at least in part, by such factors as the absorption spectrum of the polymeric material, the emission wave length of the laser, the power output of the laser, the laser beam width, the time for which the laser is applied (and whether the laser beam is pulsed or continuous), the onset and peak melting or glass transition temperature of the polymeric material, and the like. One of ordinary skill in the art can readily determine a suitable laser or lasers for a particular application using no more than routine experimentation in view of the present disclosure. Preferred lasers can operate in a pulsed-beam mode, although continuous-beam lasers may also find application in the present invention.

Preferred lasers can have a nominal power output of about 10 watts to about 100 watts, more preferably 20 to 50 watts. Larger or thicker workpieces may require lasers having greater power output, while for smaller or thinner workpieces a lower-powered laser may be preferred. However, the actual power applied to the workpiece can be less; for example, in preferred embodiments, the power of the laser energy applied to the workpiece is about 5 watts to about 30 watts, more preferably about 10 to about 15 watts.

The laser energy can be provided to the article in any desired location or pattern using conventional control means. For example, galvanometers and other control means can be used in combination with mirrors to control the location of the laser beam. A galvanometer in combination with a movable mirror is sometimes referred to as a scanner, and such scanners are well-known in the art. A pair of orthogonally-mounted scanners can be used to control the laser beam in two dimensions (x and y axes) and can be used to provide a variety of patterns of laser energy to the article of workpiece. Thus, scanners and similar systems are preferably used to control the laser beam or beams used in the present invention. Beam splitters and other apparatus can also be employed as is well-known in the art. Advantageously, computerized controls can be used to provide automated control of the laser system. Such control systems are often employed in laser systems used for cutting or etching materials such as plastics, and such conventional controls can be readily adapted for use in the present invention.

The amount of energy supplied to the article or workpiece will vary according to the size and thickness of the workpiece, the polymeric material and laser employed, and other such factors, as will be apparent to the skilled artisan. Suitable laser energy levels can be determined using no more than routine experimentation.

The article (or portion thereof) should be heated to a temperature sufficient to relieve internal stresses or stored energy; this temperature may (or may not) result in annealing and/or melting of the material. In certain preferred embodiments, the article (or a selected portion thereof) is heated to a temperature above the glass transition temperature ($T_g$) of the polymeric material; in some cases this temperature is less than about 150° C., less than about 100° C., or less than about 50° C. The glass transition temperature of certain polymeric materials can be similar to or less than the ambient temperature; for example, certain polypropylene polymers can have a $T_g$ less than 0° C. The glass transition temperature of many polymeric materials are known or can be readily determined using techniques well know in the art. In preferred embodiments, the article (or a portion of surface layer thereof) is heated to a temperature of not more than about 200° C., more preferably not more than about 150° C., and still more preferably not more than about 130° C. Sensors, including, e.g., infra-red sensors, can be used to measure the temperature of the workpiece or a portion thereof. For semi-crystalline polymers, it is generally preferred to maintain a temperature below the melting point or onset of melting temperature of the material. However, in certain embodiments some surface melting may occur without greatly affecting the strength or other properties of the material, depending, e.g., on such factors.

In relieving stresses, it is not always necessary to heat the entire thickness of a polymeric article (although heating through the entire article is possible). Therefore, in certain embodiments, it is possible to heat (e.g., heating to or above the glass transition temperature of the polymeric material) only a surface layer of the article (or a portion thereof), while not substantially heating the remainder of the workpiece. By heating only a surface layer, less energy (e.g. short pulse durations or pulse width) can be used, resulting in more rapid treatment of the article. It will be appreciated by the skilled artisan, however, that areas of the workpiece surrounding an area heated by a laser may also be heated to some extent due to conductive heat transfer from the laser-heated area(s). In certain embodiments, the laser is focused on or near the surface of the workpiece, e.g., the laser is focused to a depth not more than 1 millimeter below the surface of the workpiece, more preferably not more than 0.5, 0.01, or 0.01 millimeters below the surface of the workpiece. In certain embodiments, the laser can be focused slightly above the surface of the workpiece. In certain embodiments, the surface of the article is heated to a depth of not more than 1 millimeter, more preferably not more than 0.5 millimeters, still more preferably not more than about 0.1 millimeters. In certain embodiments, less than the entire thickness of the article is heated (e.g., heating to or above the glass transition temperature of the polymeric material); for example, in certain embodiments, only 50% of the thickness of the article (e.g., the thickness at a selected portion of the article) is heated, e.g., less than 30% of the thickness of the article is heated).

The laser energy can be scanned (e.g., as described herein) in any desired pattern or shape over the surface of the article or workpiece. For example, in preferred embodiments, the laser energy is supplied as a series of short pulses scanned over the workpiece in a series of substantially parallel lines, thereby providing laser energy to an area of the workpiece without irradiating the entire surface of the workpiece.

For example, as shown in FIG. 1, article or workpiece 10 has a narrowed portion 20 to which laser energy is applied in a pattern of parallel lines (shown as dashed lines 30). The dashed lines in FIG. 1 indicate that the laser energy can be applied as a series of dots or pulses. While the article 10 is shown in a flat or extended conformation, substantially as it might be molded, the laser energy would typically be applied to the article 10 after the article has been folded, e.g., at narrowed portion 20, where the folding causes the buildup of stresses in portion 20.

In certain preferred embodiments, a series of between 2 and 20 lines is scanned over a discrete portion of the workpiece, more preferably from 5 to 15 lines. In preferred embodiments, the lines form a substantially rectangular or square shape on the surface of the workpiece, although other shapes (circular, triangular, rhomboid, and the like) can also be employed according to the particular application. In embodiments in which multiple parallel lines of laser energy are applied to the workpiece, the lines can be separated by less than about 1 millimeter, more preferably less than about 0.5 millimeters, and still more preferably less than about 0.2 millimeters. In a preferred embodiment, the lines are separated by about 0.005" (about 0.127 millimeters). In certain embodiments, the laser energy can be applied in overlapping lines.

The laser beam can be applied at an angle of incidence to the workpiece. Differences in angle of incidence can result in differential absorption of laser energy, so differing amounts or durations of laser energy may be supplied according to the angle at which the laser beam strikes the workpiece.

Figure 2:
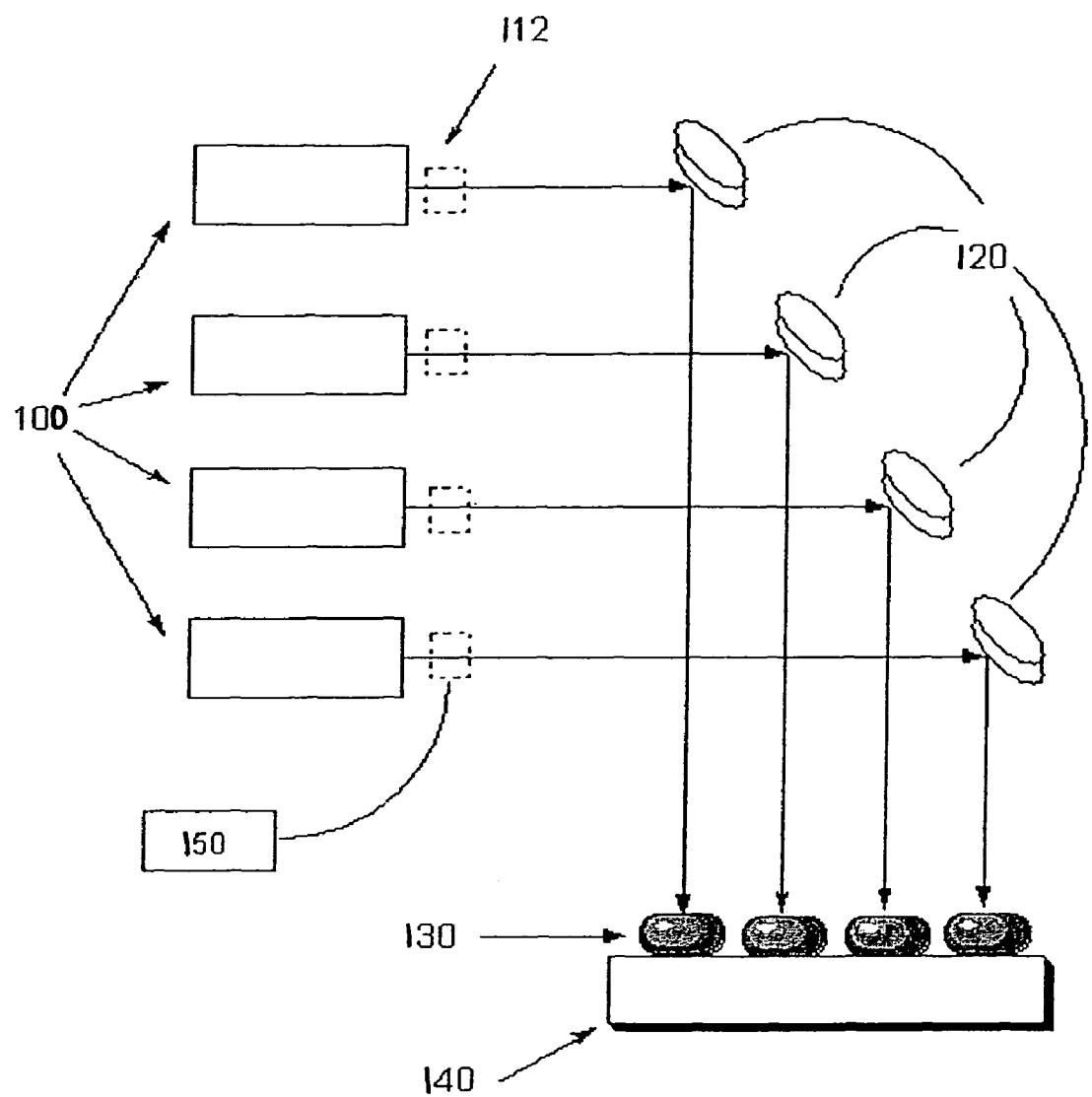
FIG. 2 is a block diagram showing one embodiment of a laser apparatus for relaxing stress in a polymeric object.

As illustrated in FIG. 2, laser energy from lasers 100 is directed by galvanometers 112 to mirrors 120, which aim the laser energy to impinge upon workpieces 130, supported on a pallet or surface 140. Galvanometers 112 are connected to computer control apparatus 150 for controlling the laser energy. In this embodiment, the galvanometers 112 can direct the laser energy from a plurality of lasers onto a single portion or region of a plurality of workpieces simultaneously (in parallel), optionally scanning each laser across additional portions of each workpiece.

Figure 3:
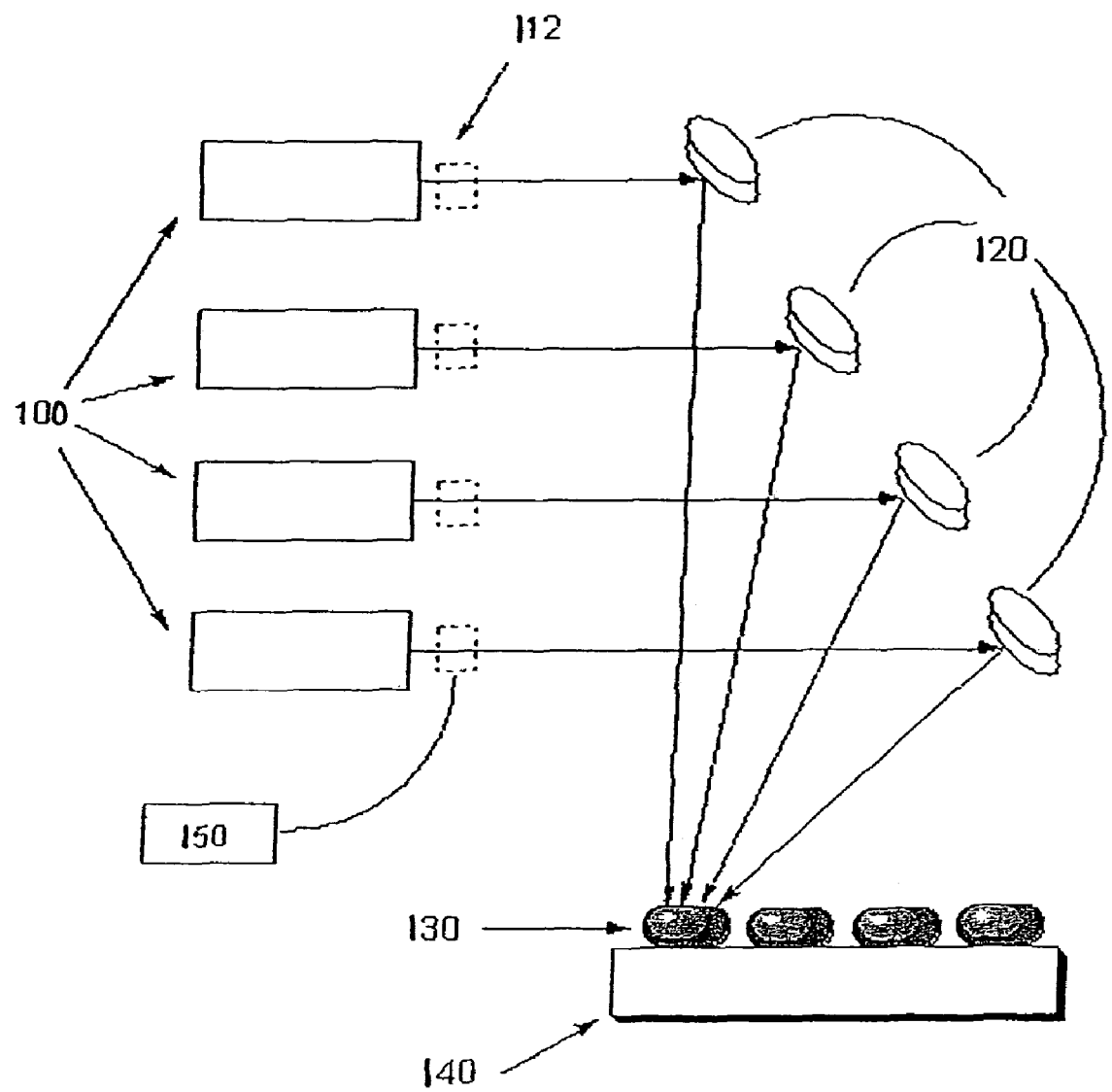
FIG. 3 is a block diagram showing another embodiment of a laser apparatus for relaxing stress in a polymeric object.

In another embodiment, shown in FIG. 3, laser energy from lasers 100 is directed by galvanometers 112 to mirrors 120, which aim the laser energy to multiple different portions of a single workpiece 130, supported on a pallet or surface 140. Galvanometers 112 are connected to computer control apparatus 150 for controlling the laser energy. A plurality of sets of mirrors can be employed (not shown), each set of mirrors focused on a single workpiece. In this embodiment, the galvanometers 112 can direct the laser energy from each of a plurality of lasers onto a single workpiece at a time, and can act upon multiple workpieces serially.

In certain preferred embodiments, the total area of a discrete portion of the workpiece to which laser energy is applied (as measured from the edges of the outer-most lines) is preferably less than about 1 square inch (about 645 square millimeters), more preferably less than about 0.1 square inch (about 64.5 square millimeters), still more preferably less than about 0.01 square inch (about 6.45 square millimeters), although multiple discrete areas of a single article can be treated (see, e.g., Example 1, infra).

In certain preferred embodiments, only a selected portion of the surface area of the article is treated with laser radiation, e.g., less than 50% of the total surface areas, more preferably less than 20% of the total surface area is exposed to laser radiation.

The beam width of the laser is preferably about 0.05 mm to about 5 mm, still more preferably about 0.1 mm to about 1 mm, more preferably about 0.3 millimeters. However, in certain embodiments, a defocused laser beam can also be employed, to provide energy over a larger area of the article, thereby decreasing the need for scanning to cover larger areas.

The pulse duration of the laser beam is preferably less than about 0.05 seconds per pulse, more preferably less than about 0.01 second per pulse, and still more preferably about 0.005 seconds per pulse.

The invention provides methods for treating articles to relieve stresses or stored energy more rapidly than conventional methods. The methods of the invention therefore permit high-throughput treatment of articles. In preferred embodiments, the total time for treatment of the article or workpiece is less than 10 seconds, more preferably less than 1 second, and still more preferably less than 0.1 second per article.

In preferred embodiments, the article is treated to relieve or relax stress (or stored energy) without substantially weakening the polymeric article (e.g., as measured by standard tests for the tensile breaking strength of the article). Thus, in certain embodiments, the tensile strength of the article is decreased by less than 30%, more preferably less than 20%, and still more preferably less than 10%, compared to an untreated article. In certain cases, the strength of the article can be increased by treatment according to the invention, e.g., the tensile strength is increased by about 1%, 5% or 10% compared to an untreated article.

As described herein, internal stress in a polymeric article can lead to changes in the solvent or chemical resistance of the article (or a portion thereof). For example, a polymeric material can absorb the solvent or chemical, potentially causing undesired swelling of the article. Alternatively, the polymeric material can be weakened or degraded by exposure to a solvent, or components of the polymeric material (including additives such as plasticizers and the like) can be leached out of the polymeric material. In certain applications, including medical applications, the solvent or chemical resistance of an article is critical to the ability of the article to perform a desired function without premature failure. Thus, in certain embodiments of the invention, the chemical or solvent resistance of the article is preserved or maintained by treatment according to the invention, compared to an untreated control article.

In preferred embodiments, the article is treated to relieve or relax stress (or stored energy) without substantially ablating polymeric material from a surface of the article, e.g., less than 0.5 millimeter of material is ablated from the surface, more preferably less than 0.1 millimeter of material is ablated from the surface, and still more preferably less than 0.05 millimeter of material is ablated from the surface. In preferred embodiment, the article is treated to relieve or relax stress (or stored energy) without substantially altering an external dimension of the article (e.g., no external dimension is changed by more than about 0.1 millimeter as a result of the treatment).

In preferred embodiments, the article is not etched or otherwise marked by the treatment according to the invention, e.g., the visual appearance of article is not substantially altered by treatment according to the invention.

It will be appreciated by the skilled artisan, based on the teachings herein, that the present methods and apparatus can be used to relieve stresses in a wide variety of articles, e.g., objects that are folded or bent, or placed under tension or stress, during molding or assembly; and objects subjected to a mechanical load during molding or assembly or assembled in an interference condition. The methods and apparatus of the invention can therefore be used to reduce or prevent cracking, surface crazing, deformation, weakening, changes in solvent resistance, and other undesired effects. Examples of articles or workpieces that can be treated according to the invention include medical devices such as needle safety shields, surgical staplers, electronic components, automotive components, labward, and the like.

In another aspect, the invention provides an apparatus for relieving stress in a polymeric article. The apparatus includes a source of laser radiation for irradiating the polymeric article for sufficient time to relieve stress in the article without ablating material from a surface of the article. In preferred embodiments, the source of laser radiation comprises a laser and a scanner for controlling movement of the laser. In preferred embodiments, the laser comprises a $CO_2$ laser.

In yet another aspect, the invention provides an article treated according to any of the methods of the invention.

The following example is provided by way of illustration and not limitation.

Example 1

A syringe needle shield was formed by molding unclarified polypropylene/ethylene copolymer. The molded shield included four hinges (two at each of two hinge locations). The molded article was then folded, laser treated, and assembled with a needle hub assembly to provide a needle shield assembly.

To relieve any tensile or compressive stresses (or stored energy) resulting from the folding of the molded shield, each hinge was treated with a carbon dioxide ($CO_2$) laser (Model GEM-30A, Coherent, Inc. Santa Clara, Calif.), having a wavelength between 9 and 11 μm (principally about 10.6 μm) and a nominal power of 30 watts (treatment with an infra-red laser like the Branson IRAM Laser ((Branson Ultrasonic Corp., Branford, Conn.)) did not result in sufficient stress relation in this case). An arrangement of four such carbon dioxide lasers was used (one for each hinge, see, e.g., FIG. 3). The laser radiation was applied to the hinge areas exclusively; the remainder of the molded article was not treated. The laser treatment was applied in a rectangular pattern at each hinge as a series of spaced apart lines (see e.g., FIG. 1); the distance between lines was about 0.005". The laser was controlled using a commercially-available galvanometer and a conventional arrangement of mirrors. Each pulse lasted less than 0.01 seconds and had a power between 11 and 15 watts. The total treatment time for each article was less than 0.1 second.

The article were tested after laser treatment and compared to untreated articles. Tests demonstrated that the treated articles had little or no residual stored energy after laser treatment. The results showed that the amount of tensile force needed to break the hinges was substantially similar in the treated and untreated articles, demonstrating that the laser treatment did not significantly weaken the hinges or otherwise adversely affect the properties of the molded articles.

All of the features, specific embodiments and particular substituents disclosed herein may be combined in any combination. Each feature or embodiment disclosed in this specification may be replaced by an alternative feature or embodiment serving the same, equivalent, or similar function. Thus, unless expressly stated otherwise, each feature or embodiment disclosed is only an example of a generic series of equivalent or similar features or embodiments.

From the above description, one skilled in the art can easily ascertain the essential characteristics of the present invention, and without departing from the spirit and scope thereof, can make various changes and modifications of the invention to adapt it to various usages and conditions. Thus, other embodiments are also within the claims.

What is claimed is:

1. A method of relieving stress in a polymeric article, the method comprising:
   folding the polymeric article at a narrowed portion of the article; and
   exposing only the narrowed portion of the article to laser radiation for sufficient time to relieve stress in the article by scanning the laser radiation over a surface of the article to form on the surface a pattern that comprises a plurality of dashed parallel lines.

2. The method of claim 1, wherein the polymeric article comprises a semi-crystalline polymeric material.

3. The method of claim 2, wherein the article comprises polypropylene.

4. The method of claim 1, wherein the polymeric article comprises an amorphous polymeric material.

5. The method of claim 4, wherein the article comprises a material selected from a polysulfone or a polycarbonate.

6. The method of claims 1, wherein the laser radiation is infrared laser radiation.

7. The method of claim 1, wherein the laser radiation is scanned over a selected portion of the surface of the article.

8. The method of claim 1, wherein the laser radiation has a beam width of about 0.1 mm to about 1 mm.

9. The method of claim 1, wherein the laser radiation is applied in pulses.

10. The method of claim 9, wherein the pulses are applied for a total of less than 10 seconds.

11. The method of claim 1, wherein the laser radiation is produced with a laser having a power of not more than 50 watts.

12. The method of claim 1, wherein the laser radiation is produced with a $CO_2$ laser.

13. The method of claim 12, wherein the $CO_2$ laser is off-focus.

14. The method of claim 1, wherein the polymeric article is heated to a temperature above the glass transition temperature of the polymeric material.

15. The method of claim 1, wherein stress is relieved substantially without ablating polymeric material from the surface of the article.

16. The method of claim 1, wherein stress is relieved substantially without altering an external dimension of the article.

17. The method of claim 1, wherein the surface area of the article exposed to laser radiation is not more than about 20% of the surface area of the article.

18. The method of claim 1, wherein the surface of the article is heated to a depth of not more than 1 millimeter.

19. The method of claim 1, wherein the article is treated with laser radiation for less than 10 seconds.

20. The method of claim 1, wherein a total area of the article exposed to laser radiation is less than about 0.1 square inch.

21. The method of claim 1, wherein a surface area of the article exposed to laser radiation is less than about 10% of the total surface area of the article.

22. The method of claim 1, wherein the laser radiation has a wavelength in the range of from about 0.8 μm to about 30 μm.

23. A method of relieving stress in a polymeric article, the method comprising:
folding a semi-crystalline polymeric article at a narrowed portion of the article; and
exposing only the narrowed portion of the article for a total time of less than 10 seconds to pulses of infrared laser radiation having a beam width of about 0.1 mm to about 1 mm to relieve stress in the article by scanning the pulses of infrared laser radiation over a surface of the semi-crystalline polymeric article to form on the surface a pattern that comprises a plurality of dashed parallel lines.

24. The method of claim 23, wherein the step of exposing at least a portion of a semi-crystalline polymeric article is performed by exposing for a total time of less than 10 seconds at least a portion of a semi-crystalline polymeric article to pulses of infrared $CO_2$ laser radiation having a beam width of about 0.1 mm to about 1 mm to relieve stress in the article by scanning the pulses of infrared $CO_2$ laser radiation over a surface of the at least a portion of the semi-crystalline polymeric article to form on the surface a pattern that comprises a plurality of dashed parallel lines.

25. The method of claim 23, wherein the step of exposing at least a portion of a semi-crystalline polymeric article to pulses of infrared laser radiation heats the surface of the article to a depth of not more than 1 millimeter.

26. The method of claim 23, wherein the step of exposing at least a portion of a semi-crystalline polymeric article to pulses of infrared laser radiation is performed by exposing at least a portion of a semi-crystalline article to pulses of infrared laser radiation via a laser having a power of not more than 50 watts.

* * * * *